US005361200A

United States Patent [19]

Weybright et al.

[11] Patent Number: 5,361,200
[45] Date of Patent: Nov. 1, 1994

[54] REAL TIME DATA COLLECTION SYSTEM

[75] Inventors: Kenneth N. Weybright; Thomas M. Forde, Jr., both of Cincinnati; Lawrence H. Mitchell, Athens, all of Ohio

[73] Assignee: Parker Marketing Research, Inc., Milford, Ohio

[21] Appl. No.: 939,450

[22] Filed: Sep. 2, 1992

[51] Int. Cl.5 .................. G06F 3/00; G06F 15/00; G06K 7/10
[52] U.S. Cl. .................. 364/401; 364/419.2; 340/825.54; 395/800
[58] Field of Search ............... 364/401, 419; 395/800; 455/2; 340/825.54; 434/350, 323, 336

[56] References Cited

U.S. PATENT DOCUMENTS

| Re. 34,340 | 8/1993 | Freeman | 358/86 |
|---|---|---|---|
| 4,764,120 | 8/1988 | Griffin et al. | 434/336 |
| 5,014,125 | 5/1991 | Pocock et al. | 358/86 |
| 5,034,807 | 7/1991 | Von Kohorn | 358/84 |
| 5,041,972 | 8/1991 | Frost . | |
| 5,057,915 | 10/1991 | Von Kohorn | 358/84 |
| 5,093,786 | 3/1992 | Derks | 395/800 |
| 5,099,444 | 3/1992 | Wilson et al. | 364/709.09 |
| 5,204,813 | 4/1993 | Samph et al. | 364/419 |
| 5,226,177 | 9/1993 | Nickerson | 455/2 |
| 5,227,614 | 9/1993 | Danielson | 235/380 |

OTHER PUBLICATIONS

Magazine advertisement from 1991 or 1992.

Primary Examiner—Roy N. Envall, Jr.
Assistant Examiner—A. Bodendorf
Attorney, Agent, or Firm—Frost & Jacobs

[57] ABSTRACT

A data collection system is disclosed for use with a panel of human respondents who answer a series of questions, and their answers are analyzed and displayed on video monitors in real time. The respondents use "smart" keypads to enter their answers using a numerical value from zero (0) through ten (10), inclusive. The numerical values from up to twenty (20) of the keypads are communicated to an intelligent junction box, at which time the numerical values are temporarily stored in memory, retaining the identity of the keypad from which each answer was derived. Up to ten (10) intelligent junction boxes can be connected to a central computer, which is a standard DOS-based personal computer, thereby allowing up to two hundred (200) keypads to be in use in a single data collection system. The numerical values from the junction boxes are communicated to the central computer and analyzed, using statistical techniques. The results of each question are displayed on a video monitor before the next question is asked of the panel. Each smart keypad can be programmed by the central computer to have any one of the appropriate keypad addresses without regard to the keypad's physical or wiring positions within the data collection system. The smart keypads also contain a liquid crystal display which gives the respondents information helpful to answering the questions. The smart keypads can also be used to give numeric results up to five (5) digits in length, in the range from zero (0) to 99,999, inclusive.

12 Claims, 8 Drawing Sheets

REAL TIME DATA COLLECTION SYSTEM

TECHNICAL FIELD

The present invention relates generally to data collection systems and is particularly directed to systems of the type used in testing new products or concepts in front of a panel of consumers. The invention will be specifically disclosed in connection with a computer which displays test results in real time as questions are being asked of a group of persons such as a panel of consumers.

BACKGROUND OF THE INVENTION

Data collection systems have been available in the past for use in conjunction with panels of human respondents. Some of the uses for such systems are to test consumer response to a new or existing product, or to sample the buying habits of the panel of respondents. The respondents can be asked questions verbally, with or without the assistance of visual aids, or they can be asked to read through a booklet which directs the respondents through a series of questions to be answered.

The respondents can be given pieces of paper to write answers to the questions being asked of them, or they can be provided with some type of electronic device which they use to record their answers electrically. Electronic systems presently available are capable of receiving the respondents' answers and storing those answers in real time into a computer system. Such electronic systems are also capable of displaying those answers in real time on a video monitor. The video monitor can show the numbers of like answers in a bar chart format, for example, and/or can show the raw data (in numerical form). One such system presently available is known by the name AcuPOLL TM, manufactured by AcuPOLL Research, Inc., and is used by market survey companies.

The presently available AcuPOLL TM electronic data collection system uses enclosures which contain several numerical keys (such as "0" through "10") for the individual respondents to use in answering questions. Such keypad enclosures are "dumb" devices in that they do not present information to the user of the keypad (the respondent, or other person who may be testing or setting up the system). Such keypads may have a light or two that provides some information. However, even with that light, the units are still not "intelligent" devices, providing only minimal information. In addition, each of these dumb keypads can only sense, and then transmit to a remote location, a single keystroke (0 through 10, inclusive) of information that represents the answer for any particular question.

The heart of a data collection system, such as AcuPOLLT TM, is a main computer which stores data received from the individual keypads. Since several keypads (up to at least one hundred units) can be used in a single data collection system, each individual keypad must have some type of identification means so that the main computer can determine which individual keypad is transmitting information at any given moment. With such means, the main computer can keep track of what answers are being given by which respondent, thereby enabling the data collection system to categorize the answers by type of respondent (male or female, for example). Since the keypads of the AcuPOLL TM system are "dumb" devices, they cannot be programmed to change their operating characteristics, and they also must have their identification means "hard" coded. In other words, each of the AcuPOLL TM keypads must have some type of identification means in hardware (rather than in software or firmware). Such identification means could be a programmable switch (such as a seven-position DIP-switch) within each keypad, or it could be merely by the use of connecting the correct wires from the main computer into the respective keypads (and being truly "hard"-coded).

Consequently, the data collection systems which are available at the present time must be set up by a rather regimented routine so that the correct keypads (having the correct identification number) are placed at their proper locations. Each keypad must be either attached to the correct wiring, or each keypad must have its identification switch (if one exists) set to the correct number. All this must be accomplished while the set-up procedure takes place, in view of the fact that the physical location of each keypad (according to its identification number) is usually very important to the overall survey results. Such procedures can be very time consuming when setting up a new testing room.

Data collection systems available at the present time also are limited in that the keypads cannot be used to send information to the person located at the keypads. With more sophisticated test sampling occurring in the future, it would be desirable to be able to communicate information from the main computer to each of the respondents who are using those keypads. Such messages could inform a respondent that the last answer given was not within the correct range of acceptable numbers, for example, for questions asking for only certain numbers as answers.

Presently available data collection systems are not capable of accepting several keystrokes from the keypads as answers to questions. In such systems, the respondents are restricted to using only one keystroke per answer, thereby allowing for only a range of zero (0) through ten (10), inclusive. A data collection system having "smart" keypads, which have more capabilities are required for such increased capabilities.

SUMMARY OF THE INVENTION

Accordingly, it is a primary object of the present invention to provide a data collection system which can send meaningful information from a central computer to a "smart" keypad located with each respondent.

It is also an object of the present invention to provide a data collection system which can send multi-digit numbers from "smart" keypads located with each respondent to the central computer.

It is another object of the present invention to provide a data collection system in which each "smart" keypad is capable of having its identification number programmed by the central computer.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved data collection system is provided having "smart" keypads for use by persons who are acting as respondents to questions calling for numerical answers. Each smart keypad can have its identification number programmed, or even reprogrammed, by a central computer which communicates to each keypad via intelligent junction boxes. The central computer can communicate with more than one intelligent junction box, and each intelligent junction box can communicate with more than one smart keypad. During set-up of the data collection system, the person performing the set-up may choose the identification address for each smart keypad, and such identification address is not dependent upon the location of the smart keypad within the overall system, and, additionally, is not dependent upon which set of wires is connected to any individual smart keypad.

The smart keypads of the data collection system of the present invention include displays which can present a message to the respondent using the keypad. Such displays are useful while initially setting up the system and for informing a respondent as to the status of certain functions during the question and answer sessions. The smart keypads can be used in a mode where only one keystroke in the range from zero (0) through ten (10), inclusive, is entered by a respondent to answer a particular question, or in an expanded mode where a multi-digit number using multiple keystrokes (for example, from 0 to 99,999) is entered by the respondent. Such capability can add considerable flexibility to the data collection system, giving it the capability for a respondent to enter his or her zip code, for example.

Still other objects of the present invention will become apparent to those skilled in this art from the following description and drawing wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification illustrates several aspects of the present invention, and together with the description serves to explain the principles of the invention. In the drawing.

DETAILED DESCRIPTION OF THE PREFERRED EMBODIMENT

Reference will now be made in detail to the present preferred embodiment of the invention, an example of which is illustrated in the accompanying drawing, wherein like numerals indicate the same elements throughout the views.

Figure 1:
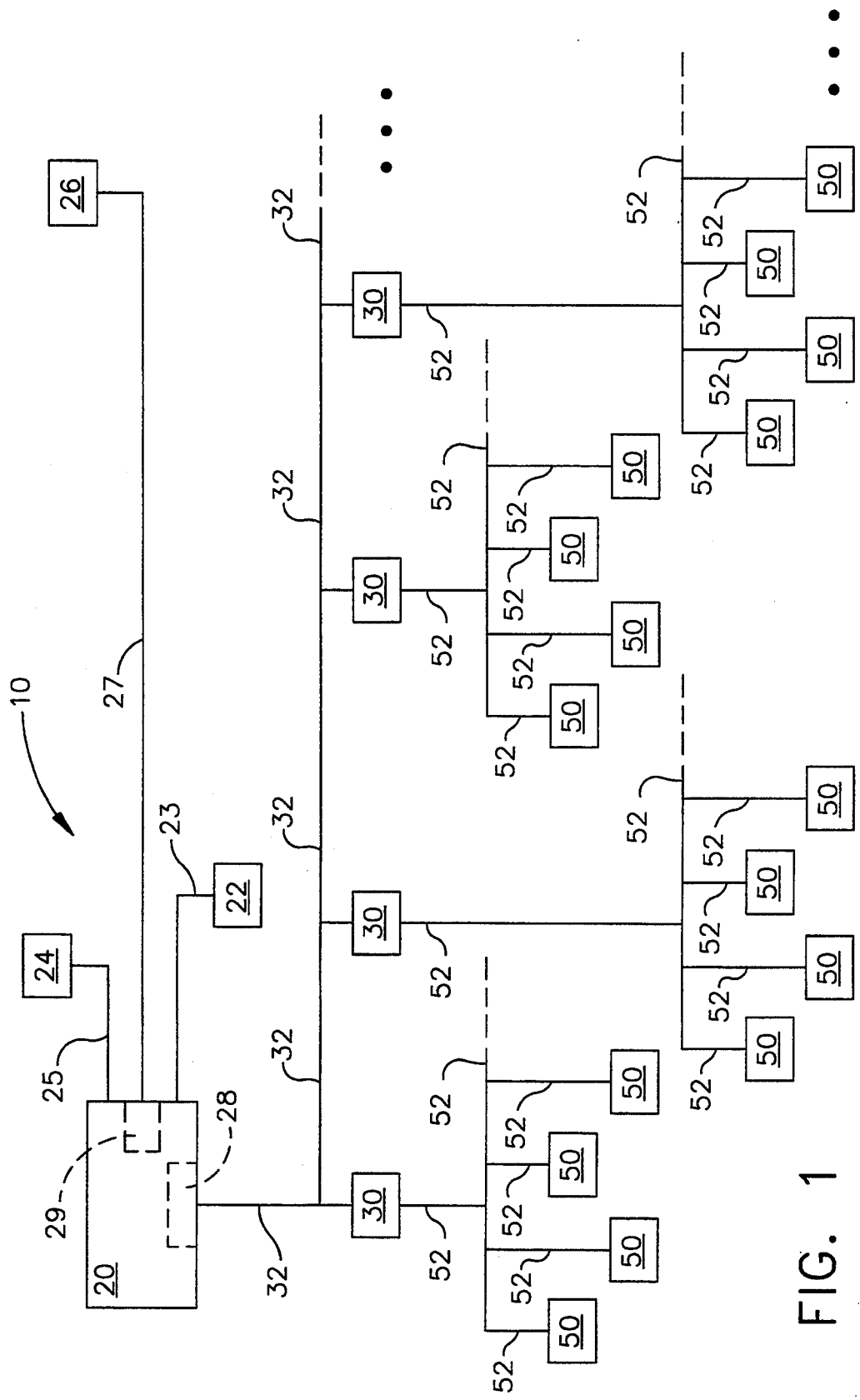
FIG. 1 is a block diagram of a data collection system constructed in accordance with the principles of the present invention.

Referring now to the drawing, FIG. 1 shows data collection system generally designated by the numeral 10 is depicted having a multitude of component parts. A central computer (CPU) 20 is the heart of the overall data collection system 10, and has several communications and data lines attached to it. For example, CPU 20 has a keyboard data cable 23 which is then attached to a local keyboard 22. Keyboard 22 is the instrument used by the systems operator to enter commands into CPU 20.

CPU 20 outputs video information into two video displays 24 and 26. Video display 24 is a local video display to be used by the systems operator of CPU 20, and is connected to CPU 20 via a video data cable 25. A remote video display 26 is used for the client to observe during a data collection session, and is connected to CPU 20 via a video data cable 27. A graphics adaptor card 29 is plugged into an expansion slot of CPU 20, and is preferably a model number Targa+64, manufactured by TrueVision, located in Indianapolis, Ind.

CPU 20 also is connected to a communications system which allows it to talk to several different junction boxes 30 and keypads 50. A multi-channel communications card 28 is mounted into one of the auxiliary printed circuit board slots in CPU 20. Communications card 28 is a standard device which is capable of communicating to various other devices using the EIA standard communications format known as RS-485. Communications card 28 is preferably a model number RS422AT-P made by Industrial Computer Source, located in San Diego, Calif.

CPU 20 is preferably a DOS-based personal computer having at least two disk drives (a hard disk drive and a floppy disk drive), at least four megabytes of RAM (random access memory), and at least two full-sized expansion slots. Such personal computers are commonly available, and excellent results have been achieved with a laptop computer model number T3200SX, manufactured by Toshiba. As related above, a plug-in multi-channel communications card 28 is placed into one of the expansion slots of CPU 20, and such communication cards are common for standard DOS-based personal computers. In addition, a graphics adaptor card is placed into a second expansion slot of CPU 20, which is used to provide graphic displays to remote video display 26. The above-mentioned Toshiba T3200SX laptop computer includes its own display card used with local video display 24.

A desktop computer can also be used as CPU 20. Such desktop computer must have the above-related disk drives and RAM, and also needs at least two full-sized expansion slots. In addition, the desktop computer will require a display card to drive the local video display 24 (which would be a separate device). The desktop computer must contain the equivalent of an Intel 386SX microprocessor.

Data messages are sent using the RS-485 communications format via data cable 32 into one or more intelligent junction boxes 30. Using the RS-485 communications protocol, every message sent by CPU 20 is received by each of the multiple intelligent junction boxes 30. It is then up to each individual intelligent junction box 30 to decide whether or not that message is meant for that particular junction box. The communications message format used to determine which junction box 30 is to respond is discussed in detail below. In the preferred data collection system 10, there can be between one (1) and ten (10) intelligent junction boxes 30, all communicating using the RS-485 communication format via data cable 32.

Each of the intelligent junction boxes 30 can further communicate to at least one smart keypad 50, via data cable 52. In the preferred data collection system 10, each of the intelligent junction boxes 30 can be connected to between one (1) and twenty (20) of the smart keypads 50, via a data cable 52 per intelligent junction box 30. The communications protocol used between each intelligent junction box 30 and each of the smart keypads 50 is the EIA standard known as RS-485. The network of data cable 52 which is connected between several smart keypads 50 and one particular intelligent box 30 is known as the "keypad network". The network of cables 32 which is connected between all of the intelligent junction boxes 30 and the CPU 20 is known as the "junction box network".

Figure 2:
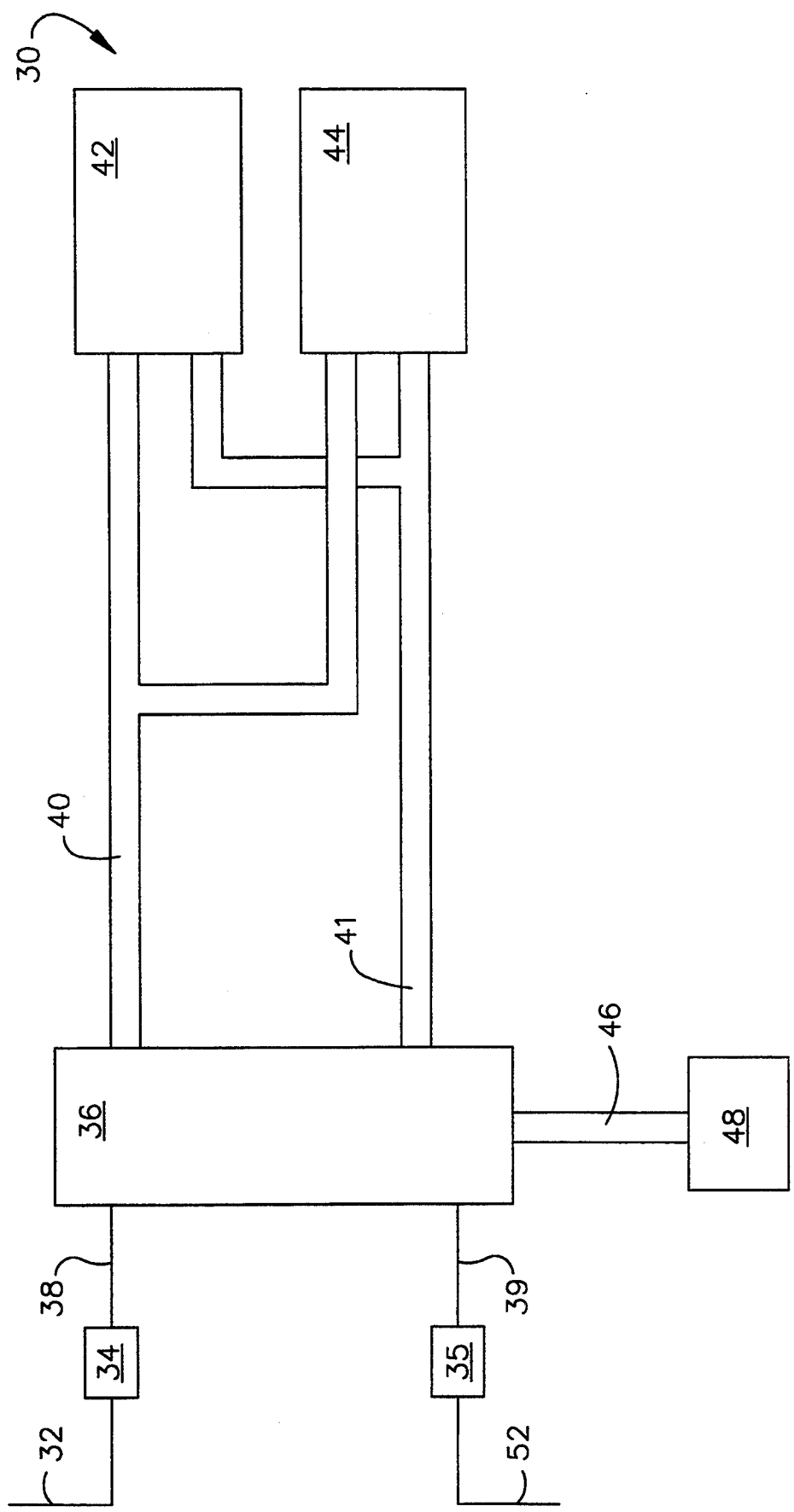
FIG. 2 is a block diagram of the major components of an intelligent junction box, as used in FIG. 1.

FIG. 2 depicts the major hardware which is used to construct the preferred intelligent junction box 30. A data cable 32, which is part of the junction box network, is used to connect CPU 20 to intelligent junction box 30. Data cable 32 is connected into a line driver/receiver circuit 34 which is an interface circuit that converts the RS-485 signals into lower level data signals which can be interfaced into a microprocessor. A serial data circuit 38 transfers data to and from line driver/receiver circuit 34 and microprocessor 36.

The microprocessor, generally designated by the numeral 36, is preferably a model number 647180XCP, manufactured by Hitachi. Microprocessor 36 is connected to a data bus 41 and an address bus 40. Data bus 41 is directly connected into both ROM (read only memory) 42 and RAM (random access memory) 44. The preferred type of ROM device in intelligent junction box 30 is an EPROM chip. The preferred type of RAM in intelligent junction box 30 is an 8 k ×8 byte RAM chip. The address bus 40 includes chip select programmable logic arrays, which are used to properly select which RAM or ROM chip is to be in communication with microprocessor 36 at any given time.

Intelligent junction box 30 also includes certain control switches 48 which are used to configure the junction box 30. Control switches 48 are preferably a group of DIP switches, and preferably have at least eight poles per DIP-switch. Control switches 48 are communicated to microprocessor 36 via a series of control circuits 46, which transfer the important configuration information into microprocessor 36. Such information includes the address of the intelligent junction box 30, which can be numbered between 201 through 210, in the preferred data collection system 10, Each intelligent junction box 30 must communicate to at least one smart keypad 50, via a data cable 52. Data cable 52 is connected into a second line drive/receiver circuit 35, which in turn is connected to a serial data circuit 39. Line driver/receiver circuit 35 interfaces the RS-485 signals into lower voltage data signals which can be then interfaced directly into microprocessor 36 via serial data circuit 39.

Figure 3:
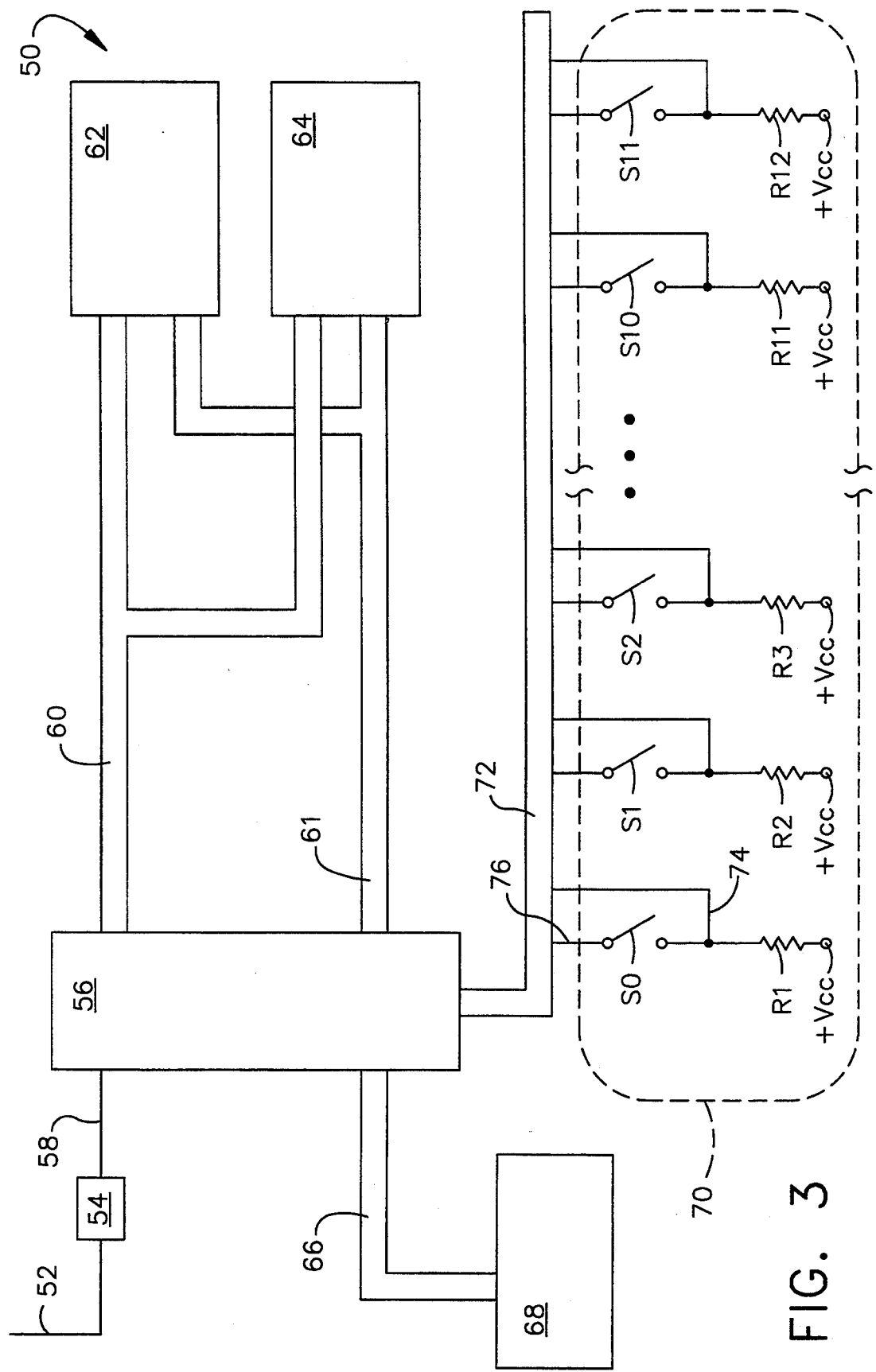
FIG. 3 is a block diagram of the major components of a smart keypad, as used in FIG. 1.

FIG. 3 depicts the major hardware components of a preferred smart keypad 50 used in data collection system 10. A data cable 52, which communicates data from the keypad network using the RS-485 format, is connected into a line driver/receiver circuit 54. Line driver/receiver circuit 54 converts the RS-485 signals into lower level data signals which can be interfaced into microprocessor 56 via the serial data circuit 58. Microprocessor 56 is preferably a part number 68HC11ABFN, manufactured by Motorola, Inc. Microprocessor 56 is directly connected to an address bus 60 and a data bus 61. Data bus 61 is also directly connected to a ROM 62, which is preferably a part number 27C256 EPROM integrated circuit, and a RAM 64. Address bus 60, including chip select programmable logic arrays, is connected to both ROM 62 and RAM 64. In the preferred embodiment of smart keypad 50, the RAM 64 is an 8 k ×8 byte random access memory integrated circuit. Microprocessor 56 also communicates data to a liquid crystal display (LCD) 68 via data circuits 66. In the preferred smart keypad 50 of the present invention, liquid crystal display 68 contains two lines of sixteen characters (2×16) each.

Microprocessor 56 also communicates to a series of pushbutton switches which are grouped in a switch array circuit 70. Switch array circuit 70 is connected into data ports of microprocessor 56 via a plurality of parallel data circuits 72. Each of the switches can have its own individual data circuit, or the switches can preferably be multiplexed, in which more than one switch shares a single data circuit in different time slots. The use of multiplexing saves a number of data circuit paths.

In the preferred smart keypad 50 of the present invention, there are twelve individual pushbutton switches, designated S0-S11. Each of these switches is pulled up to a power supply voltage known as plus $V_{cc}$, through pullup resistors R1–R12. When a particular data switch is open, then the signal at the location designated by the numeral 74 (for data switch S0, for example) is pulled up to the voltage level of $+V_{cc}$, which is typically 5 volts DC. When the particular data switch is closed, then the signal (at location 74, for example) is then pulled down to the voltage level that exists on the other side of the switch, at the location designated by the numeral 76 (for S0, for example). This voltage at location 76 is typically near ground potential.

Central computer 20 contains a computer program which controls both video displays 24 and 26, accepts input data from local keyboard 22, and communicates in both directions with the intelligent junction boxes 30 via the junction box network data cable 32. A flow diagram 100 is provided in FIGS. 4A, 4B, and 4C. The first thing the computer program does is accept keyboard entry for the password in function block 102. The program checks to see if a correct password has been entered in decision block 104. If a correct password was not entered, then the program goes to its end at function block 182. At this point a new password can be entered back at function block 102.

If a correct password has been entered, the program then checks to see if the password is a special password in decision block 106. If the password is a special password, CPU 20 does not initialize all of the keypads 50 in the system with new, reassigned keypad addresses.

On the other hand, if the password is not a special password, then the CPU 20 uninitializes all of the keypads 50 in function block 108. The systems operator is first asked to provide CPU 20 with the number of keypads 50 that are connected into data collection system 10 (up to two hundred keypads). Then CPU 20 sends out a data message over the junction box network 32, using the following format: ADDRESS; AUXILIARY BYTE; DATA WORD. In the case of a message to uninitialize, CPU 20 would send out the message: 255, 7, 0. The address of #255 means that the message should be acted upon by all keypads 50 and all junction boxes 30. The auxiliary byte value of seven (7) means that each of those junction boxes 30 and keypads 50 should uninitialize their existing addresses. The data word equaling zero (0) is information which is ignored by those junction boxes 30 and the keypads 50 in this circumstance.

Once all of the keypads 50 have been uninitialized, CPU 20 enters a mode where each of the keypads 50, one at a time, are initialized with new addresses. This mode starts with function block 110 which initializes the keypads 50 by sending the following message: 254, 5, KEYPAD ADDRESS, meaning all keypads are to heed the message, the auxiliary byte of five (5) means to initialize one of the keypads 50, followed by the particular keypad address (in the range from 1–200) which is the next to be initialized. CPU 20 also sends the following message: 254, 31, 0, which commands all uninitialized keypads 50 to display the message, "Ready to Initialize" on LCD 68. CPU 20 now waits to receive a message from one of the keypads 50 that its Enter key, S-11, has been pressed. A message is generated by the keypad 50 which then has its Enter key, S-11, pressed, as follows: KEYPAD ADDRESS, 6, KEYPAD ADDRESS. CPU 20 then acknowledges to that particular responding keypad 50 that it has now become address #23, for example, in the system, and that it has been initialized by sending the following message: KEYPAD ADDRESS (#23), 32, KEYPAD ADDRESS (#23). This commands keypad #23 to show the following message on its display 68: "Initialized as Keypad #23,". This message allows the systems operator who is setting up the system (in conjunction with a set-up operator) to understand that CPU 20 has recognized that this particular keypad 50 is now addressed as #23 in the data collection system 10.

CPU 20, using decision block 114, determines whether this keypad was the last keypad 50 to be programmed in this particular system. If the answer is "no", then CPU 20 increments the keypad number using function block 115, and the program goes back to function block 110 which will initialize the next keypad 50, in this case having the address of #2. This loop of initializing a keypad 50 by function block 110, and determining whether this was the last keypad 50 in the system according to decision block 114, continues until all of the keypads 50 in the system have been programmed with an address.

Once CPU 20 has initialized the last keypad 50 in the system, it decides, using decision block 114, that it is now time to test all of the keypads 50. Each keypad is tested according to function block 112. Each keypad 50 individually will enter a "Test" mode, in a sequence according to the numeric value of the keypad address, after receiving the following message from CPU 20: KEYPAD ADDRESS, 33, NUMBER OF KEYS TO TEST. This message commands an individual keypad 50 to display a message, "Ready to Test," after which time the set-up operator will press any of the keys S0 through S10 of keypad 50.

As the test mode commences, the systems operator is asked, via local video display 24, to enter the number of keystrokes that are to be entered at each keypad 50 during the testing procedure. The systems operator then enters a number in the range of one (1) through twelve (12), inclusive. If the number one (1) is entered, for example, then the set-up operator will be required to perform only one (1) keystroke at each keypad 50. At one of the individual keypads 50, the set-up operator could press the number five (5), for example, after which the liquid crystal display (LCD) 68 should display the number five (5). If the number five (5) does not appear on LCD 68, or if a different number appears in its place, then that particular keypad 50 has failed the test of function block 112. After one of the keys S0 through S10 has been pressed (in this example), this particular keypad 50 sends the following message to CPU 20: KEYPAD ADDRESS, 4, KEYPAD ADDRESS. CPU 20 then sends an additional message, as follows: KEYPAD ADDRESS, 34, 0. This message commands the particular keypad 50 to display a message, "Tested."

CPU 20, using decision block 116, now determines whether this keypad was the last keypad 50 to be programmed in this particular system. If the answer is "no", then CPU 20 increments the keypad number using function block 117, and the program goes back to function block 112 which will test the next keypad 50, in this case having the address of #2. This loop of testing a keypad 50 by function block 112, and determining whether this was the last keypad 50 in the system according to decision block 116, continues until all of the keypads 50 in the system have been tested by the set-up operator.

Once CPU 20 has tested the last keypad 50 in the system, it decides, using decision block 116, that it is now time to send a welcome message to all of the keypads 50, using function block 118. CPU 20 does so by sending the following message: 254, 16, 0, which means that it is commanding all of the keypads 50 in the system to display the following message: "Welcome! Thanks for coming".

The same "Welcome" message of function block 118 is used by CPU 20 if decision block 106 determines that the original password was special. In that instance, all of the initializing and reinitializing of the keypads 50 are eliminated, and whatever addresses each of the smart keypads 50 already contained in data collection system 10 are retained by those same keypads 50.

After CPU 20 sends the welcome messages according to function block 118, the systems operator at CPU 20 then enters the file name to be used, by use of function block 120. This file name will denote a data file which will contain all of the data accumulated during the upcoming data collection session. At this time, the systems operator can enter the number of respondents taking part in the session, using function block 122. The number of respondents will be less than or equal to the number of keypads 50 that have been initialized in the system. After that has occurred, function block 124 creates a file on the disk that has the above-entered file name, and reserves file space for all of the data that will now be collected. After this occurs, CPU 20 sends a message to all of the keypads 50 commanding them to display on each of their displays, "Question #1, Please wait," using the following message format: 254, 18, 0.

Figure 4A:
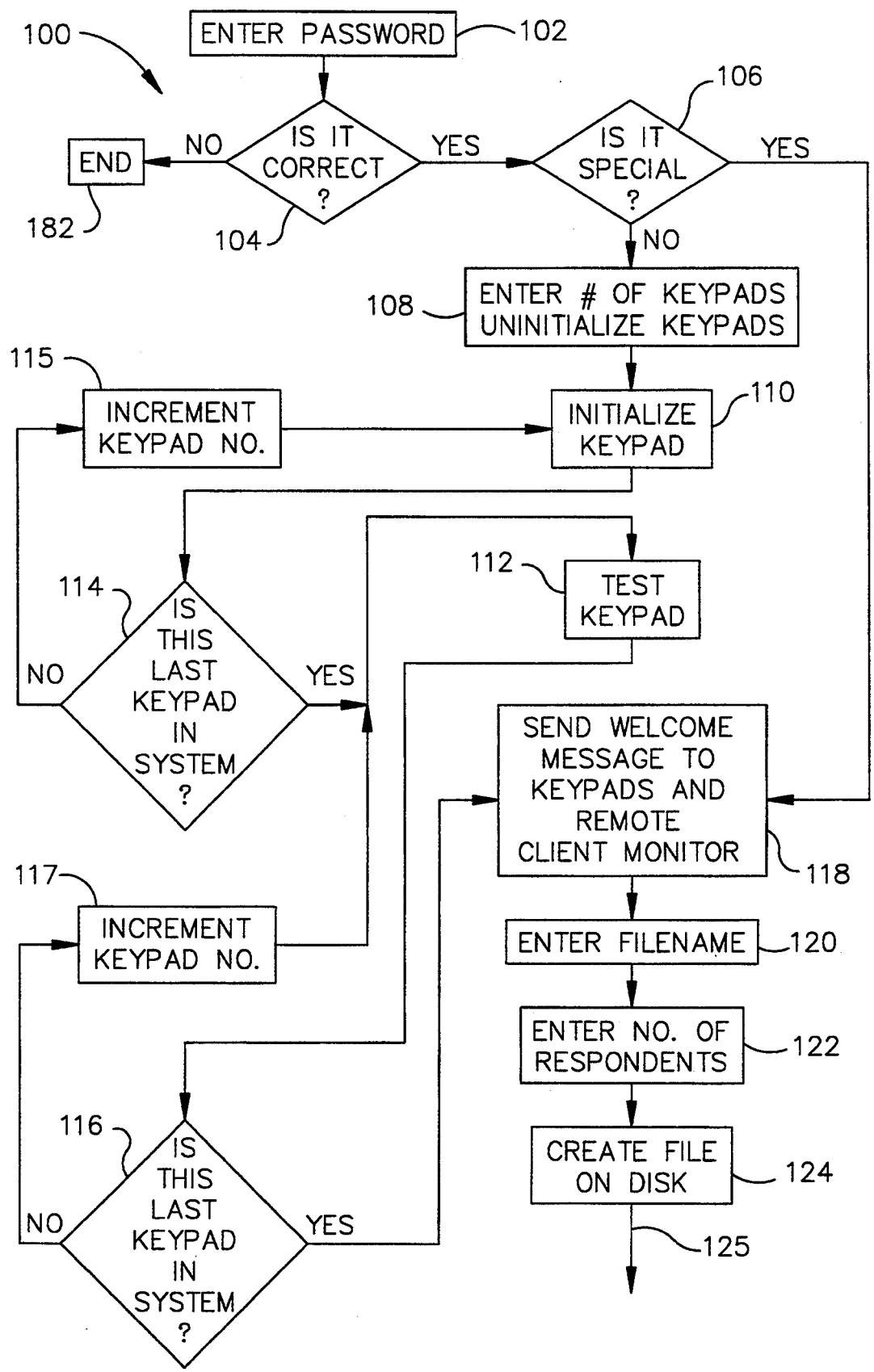
FIGS. 4A, 4B, and 4C combined constitute a flow chart of the operational functions of the central computer as used in FIG. 1.
Figure 4B:
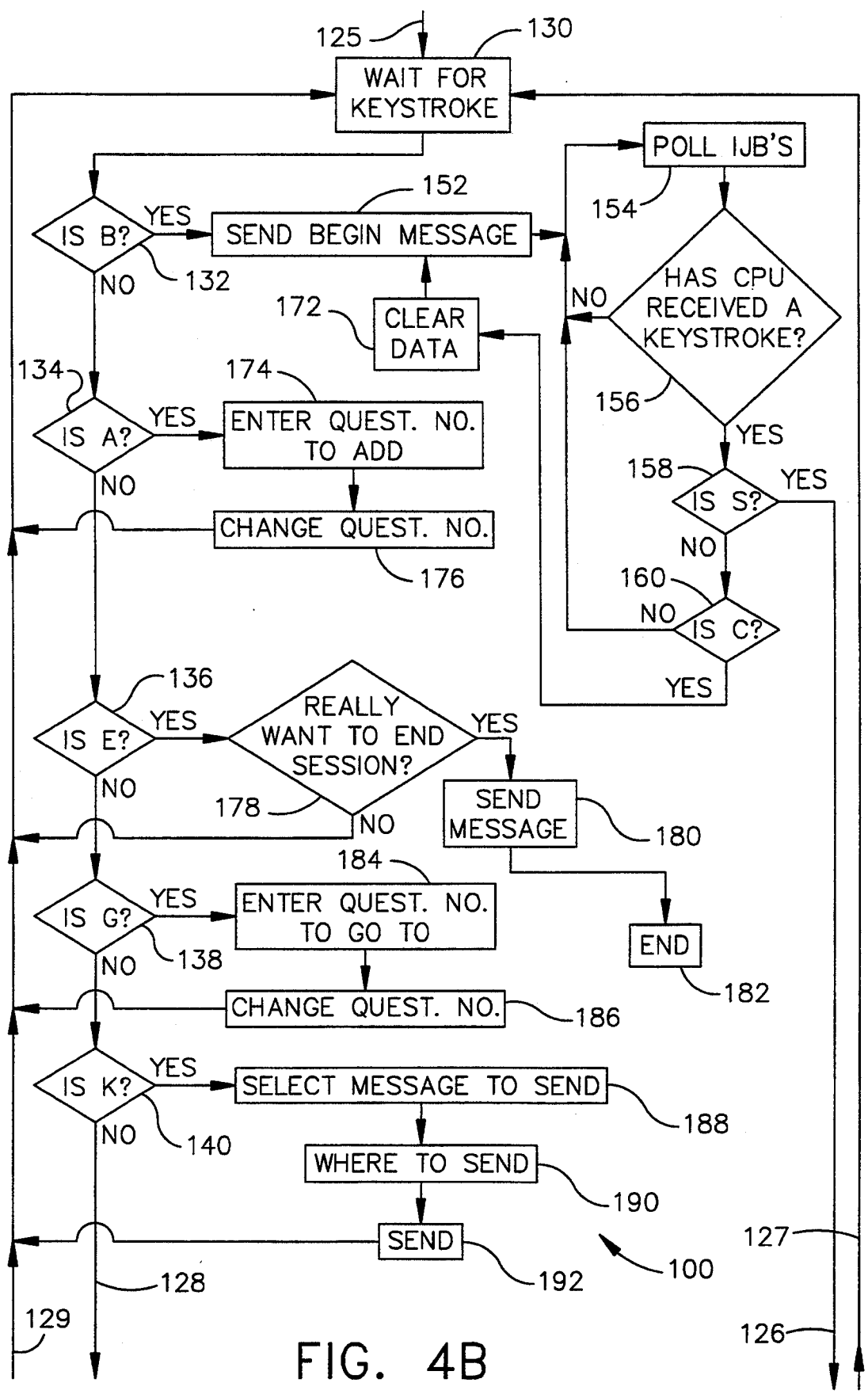

The logic flow follows arrow 125 from FIG. 4A to FIG. 4B, arriving at function block 130 wherein CPU 20 waits for a keystroke by the systems operator on keyboard 22. At this point in the data collection session, a human moderator would give a brief introduction and perhaps run through one or two trial questions, thereby allowing the respondents to get used to the system equipment and procedures. When it is time to begin the actual data collection session, the moderator would then read question #1. At this time the systems operator types the letter "B," which is detected by decision block 132. Once that occurs, CPU 20 sends a "begin" message, by use of function block 152, by sending the following data message via junction box network 32: 255, 19, QUESTION NUMBER. The effect of this message is to tell all of the junction boxes 30 and smart keypads 50 that it is now time for the respondents to answer the question, and also tells smart keypads 50 to display the following message on display 68: "Question #1, Answer now."

At this time, CPU 20 polls all of the initialized intelligent junction boxes 30, using function block 154. The details of how the junction boxes 30 and keypads 50 are polled will be discussed below. At CPU 20, the data collection process for question #1 is occurring automatically as each of the junction boxes 30 sends information concerning the results of their keypads 50 to CPU 20. This continues until the systems operator types a keystroke at keyboard 22, which is determined by decision block 156. If no keystroke has been entered, the CPU 20 continues to poll the junction boxes 30 according to function block 154. Once a keystroke has been entered at keyboard 22, decision block 158 determines whether or not the keystroke was the letter "S". If the keystroke was an "S," the systems operator is commanding the system to stop polling the junction boxes 30. CPU 20 accomplishes this, following the logic flow along arrow 126 from FIG. 4B to FIG. 4C, by outputting a "stop polling" message according to function block 162, which sends the following message: 255, 20, 0. This message commands the keypads 50 to display the following message on their displays 68: "Thank you, Please wait".

After the "stop" message has been sent, CPU 20 performs calculations on the data (using function block 164) which by now has been received from the junction boxes 30, by use of messages which will be discussed in greater detail below. The data from each of the keypads 50 is stored as a five digit decimal number, in the range of 00000 to 99999. If one of the respondents fails to answer the question at all, then a hyphen is placed into the data file rather than a number within the above-defined range. CPU 20 performs calculations to determine the percentages of each of the keys 0–10 (S0–S10) on each of the smart keypads 50 that were pressed by the respondents as a collective group, CPU 20 then displays the results in percentages in the form of a three-dimensional bar chart on the remote video display 26, which is normally viewed by the client who is sponsoring the data collection session. In addition to the bar charts, certain numerical data is also calculated by CPU 20, as follows:

(1) Mean = $\Sigma x \div m$, where x is the value of the result (0–10), and m represents the number of respondents who answered that particular question.
(2) Standard deviation, which is a well known statistical value.
(3) Confidence interval = $[1.96(\text{standard deviation})] \div \sqrt{n}$, where n represents the number of respondents.
(4) Index = standard deviation ÷ 280.

At this time, CPU 20 saves the data, according to function block 166, onto either a hard disk or a floppy diskette. In this manner, if power should be lost to the CPU 20, then only the most recent questions' results would have been lost. After the data has been saved, the bar chart and numerical information is then displayed on the remote video display 26 for use by the client who is sponsoring this particular data collection session, according to function block 168. After that has occurred, function block 170 then clears all data from the arrays containing the answers which have been stored within CPU 20. Thus the memory (RAM) is then available for the results of the next question to be asked. After all of this has been accomplished, the logic flow follows arrow 127 from FIG. 4C to FIG. 4B, arriving at function block 130, waiting for the next keystroke by the systems operator on local keyboard 22.

During the polling process of the junction boxes 30, if the systems operator types a keystroke which is a "C" rather than a "S", then the flow diagram passes through decision block 158 to decision block 160. At this point, the data array of information within CPU 20 is cleared by function block 172. This feature can be used when, for whatever reason, the systems operator determines that it would be best to eliminate whatever information had been gathered and to start over with that particular question. When this occurs, the CPU 20 sends another "begin" message according to function block 152 (after the "B" key is pressed), and then restarts the polling process under control of function block 154. CPU 20 sends a message, 255, 21, QUESTION NUMBER (e.g., 1), which commands all keypads 50 to display the following message on LCD 68: "Question #1, Re-answer quest." If the keystroke that was hit is neither an "S" or "C", then the polling process continues uninterrupted.

Once a question is completed, and the data array is cleared by function block 170, then the systems operator will normally type one of two keys, either an "N" or a "G". If the systems operator merely wishes to increment the question number (for example from 5 to 6), then the systems operator only need type the letter "N". When that occurs, decision block 144 sends the flow diagram to a function block 202, which then increments the question number by one (1). After that occurs, the flow diagram leads back to function block 130 where the CPU 20 waits for another keystroke.

If the systems operator decides that he wishes to go back to a previously asked question, then he can type the letter "G" (go back to). The decision block 138 will detect this, and then send the flow diagram to function block 184 where CPU 20 will receive the question number that the systems operator wishes to go back to. The systems operator merely needs to type the message "G___<CR>," in which "G" represents the type of command, "___" represents the new question number, and <CR> represents a carriage return. After that occurs, function block 186 charges the question number from whatever it was to the newly entered question number. At that point, CPU 20 waits for a keystroke using function block 130.

The systems operator can also skip to a more advanced question number by typing the keystroke "P". The P will be detected by decision block 146, and function block 204 will allow the systems operator to enter a new question number which will then be "skipped to." In a similar fashion to the "go back to" message recited above, the systems operator then types the letter "P," a three digit number for the question number to be "skipped to," and then a carriage return (P___<CR>). At that point, CPU 20 changes to that question number by function block 206. CPU 20 then waits for a keystroke according to function block 130.

Another feature of data collection system 10 is the ability to add a question number to a list of question numbers that has already been completed. The systems operator would type the letter "A", which would be detected by decision block 134. At this point, function block 174 allows the systems operator to add a new question number by typing the letter A, then a three digit number, and a carriage return (A_____<CR>). CPU 20 now changes the question number to that newly entered number according to function block 176. After that occurs, CPU 20 will wait for the next keystroke according to function block 130.

After any of the above four types of question number changing commands have occurred (increment, "N"; GO-TO, "G"; SKIP-TO "P"; or ADD, "A"), then CPU 20 sends a new message to all of the keypads 50. As at the beginning of any question, CPU 20 sends a message as follows: "254, 18, 0," thereby commanding each of the keypads 50 to display the message, "Question #_____, Please wait." Of course, when the respondents start to answer the question, the data that they enter will then be placed into the RAM array at CPU 20 which has been reserved for that question number. If a question has been added, the data array within the opened file at CPU 20 is increased automatically by the computer program to accommodate that additional question's results.

Other useful features of data collection system 10 can be utilized by the systems operator via local keyboard 22. The systems operator can end the data collection session, send a particular message to one or all keypads 50, place the keypads 50 into a "multi-key" mode, reinitialize one of the keypads 50, and allow the respondents to take a break and send them a corresponding message.

For example, if the systems operator enters the letter "K", which would be detected by decision block 140, then the systems operator can select a message to be sent to either one keypad 50 or all of the keypads 50. Using function block 188, the systems operator can select the message desired to be sent to one or more keypads 50. Such a message could be as follows: "#, then Enter, (response)"; "$, then Enter, (response)"; "Terrible . . . Great, (response)"; "Not impor . . . Very, (response)"; "Never . . . Always (response)"; or "Less . . . More, (response)." After telling CPU 20 which message to send, the systems operator can inform the CPU whether it should be sent to one particular keypad 50 or to all of the keypads 50 under the control of function block 190. After that information has been entered into CPU 20, the systems operator then commands CPU 20 to actually send the message according to function block 192. After that has occurred, the flow diagram goes back to function block 130, waiting for the next keystroke.

Another useful feature is the "multi-key" mode of entering data. If the multi-key mode is not "on", then the respondents can only enter one number, in the range 0–10, for each of the answers to one of the questions. On the other hand, if the multi-key mode is "on", then the respondent can enter a five digit number in the range of zero (0) through 99,999. Each respondent can type in any of the keys 0–9 (S0–S9) up to five times, and then hit the enter key (S-11) which then sends the entire five digit number to the correct junction box 30. CPU 20 must instruct the keypads 50 to go into the multi-key mode, however, before such an operation can take place.

Figure 4C:
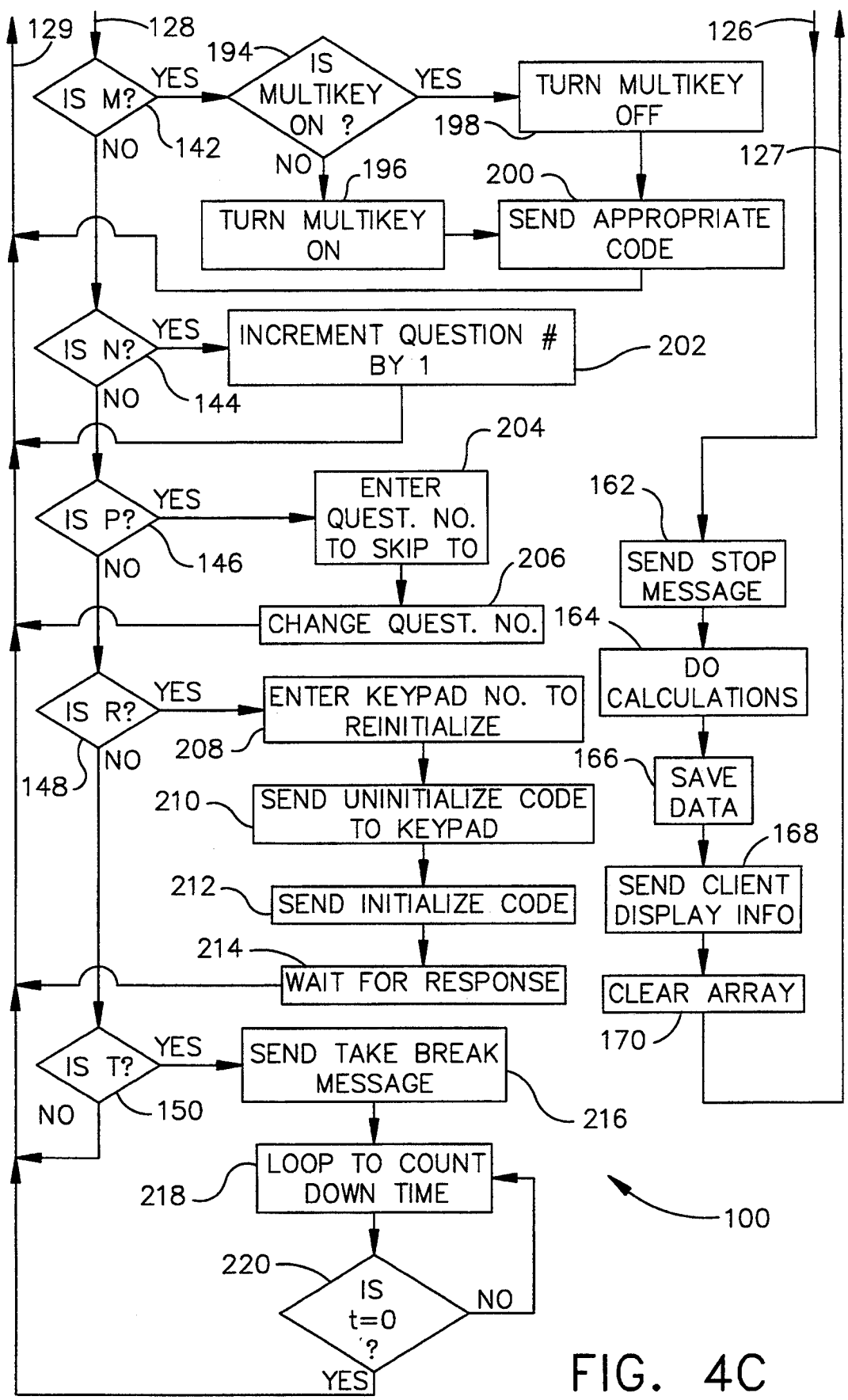

This multi-key feature is depicted on FIG. 4C, after following the logic flow along arrow 128 from FIG. 4B to FIG. 4C. The systems operator enters the letter "M" at keyboard 22, which is detected by decision block 142. The logic flow then proceeds to another decision block 194 which determines whether or not the multi-key mode is already on. This multi-key function acts as a toggle, in that by pressing the letter "M", the systems operator can either turn the multi-key mode on or off, depending upon its last state. Decision block 194 determines which state the multi-key mode is presently in, and if the multi-key mode is already on, sends the logic flow to function block 198 which then turns the multi-key mode off. On the other hand, if the multi-key mode is not already on, decision block 194 sends the logic flow to function block 196 which then turns the multi-key mode on. In either case, the appropriate code is sent to the keypads 50 by function block 200. A message is sent from CPU 20 via junction box network 32 as follows: to turn the multi-key mode on, 255, 64, 0; to turn the multi-key mode off, 255, 65, 0. After that has occurred, the logic flow follows arrow 129 from FIG. 4C to FIG. 4B, arriving at function block 130, waiting for the next keystroke.

If it becomes necessary to reinitialize one of the keypads 50, the systems operator can type the letter "R" which will be detected by decision block 148. After typing the letter "R", the systems operator then enters which keypad number is to be initialized, using function block 208. Function block 210 then sends the uninitialization code to that particular keypad 50, using the following message format: KEYPAD ADDRESS, 7, 0. After that message has been sent, CPU 20 sends a message to newly initialize that same keypad 50 by function block 212, sending the following message: 254, 5, KEYPAD ADDRESS. CPU 20 then waits for a response according to function block 214. The correct response would be for the particular keypad 50 to send a message as follows: KEYPAD ADDRESS, 6, KEYPAD ADDRESS. After the correct response is received, the CPU 20 logic flow goes to function block 130, waiting for the next keystroke.

Another feature the systems operator can take advantage of is to allow the respondents to take a break during a question and answer session. After the moderator announces that a break will be taken, the systems operator can type the letter "T" which is detected by decision block 150. The logic flow then proceeds to function block 216 which sends a "take-break" message to each of the keypads 50 using the following data message: 254, 29, TIME LEFT (in minutes). A message will then appear on the display 68 of each of the keypads 50, as follows: "Please return in (___) minutes." The number of minutes can be hard-coded for ten (10) minutes, for example, or can be determined by the systems operator who enters that information after typing in the initial "T". After this message is sent, function block 218 starts a loop to count down the remaining break time. As function block 218 counts the time down from, for example, fifteen (15) minutes to zero (0) minutes, a decision block 220 detects when that time reaches zero (0). When the time has reached zero (0), the logic flow returns to function block 130, waiting for the next keystroke.

When it is time to finish the current question and answer session, the systems operator types the letter "E", which is detected by decision block 136. After that occurs, CPU 20 double checks with a query, "Do you really want to end this session?" The systems operator either presses the "N" key, meaning, "no," he does not wish to end the session, or the "Y" key, meaning that, "yes," he really wants to end the session. This yes or no response is detected by decision block 178. If the answer is no, the logic flow then returns to function block 130, waiting for the next keystroke. If the answer is yes, the logic flow proceeds to function block 180 which sends messages to all of the keypads 50 stating that, "You did a great job—thanks". This message is sent by CPU 20 via junction box network 32 in the following format: 254, 30, 0. At this time, an additional message is sent to the remote video display 26 via video data cable 27, which also states that the end of the session has occurred. After these messages have been sent, the logic flow proceeds to function block 182, which ends the computer program (thereby ending this data collection session).

The above description of the software program for CPU 20 sets forth a preferred method for using data collection system 10. It will be understood that additional types of messages could be sent to and from CPU 20, and the message and data formats could be somewhat different without varying from the principles of the present invention. The details of how the intelligent junction boxes 30 and the smart keypads 50 receive and transmit data messages, and how they manipulate data within their own hardware structures, will be discussed below, and was purposefully not discussed above so as to concentrate on only the workings of the CPU 20 and to simplify such explanation. The message formats of messages sent by both junction boxes 30 and keypads 50 that are received by CPU 20 have a similar data format: an address, an auxiliary byte, and a data word. Some of the messages received by CPU 20 are to be interpreted by CPU 20 with respect to the computer program which was described in CPU flow diagram 100. Additional details on such data formats are also discussed below.

Figure 5:
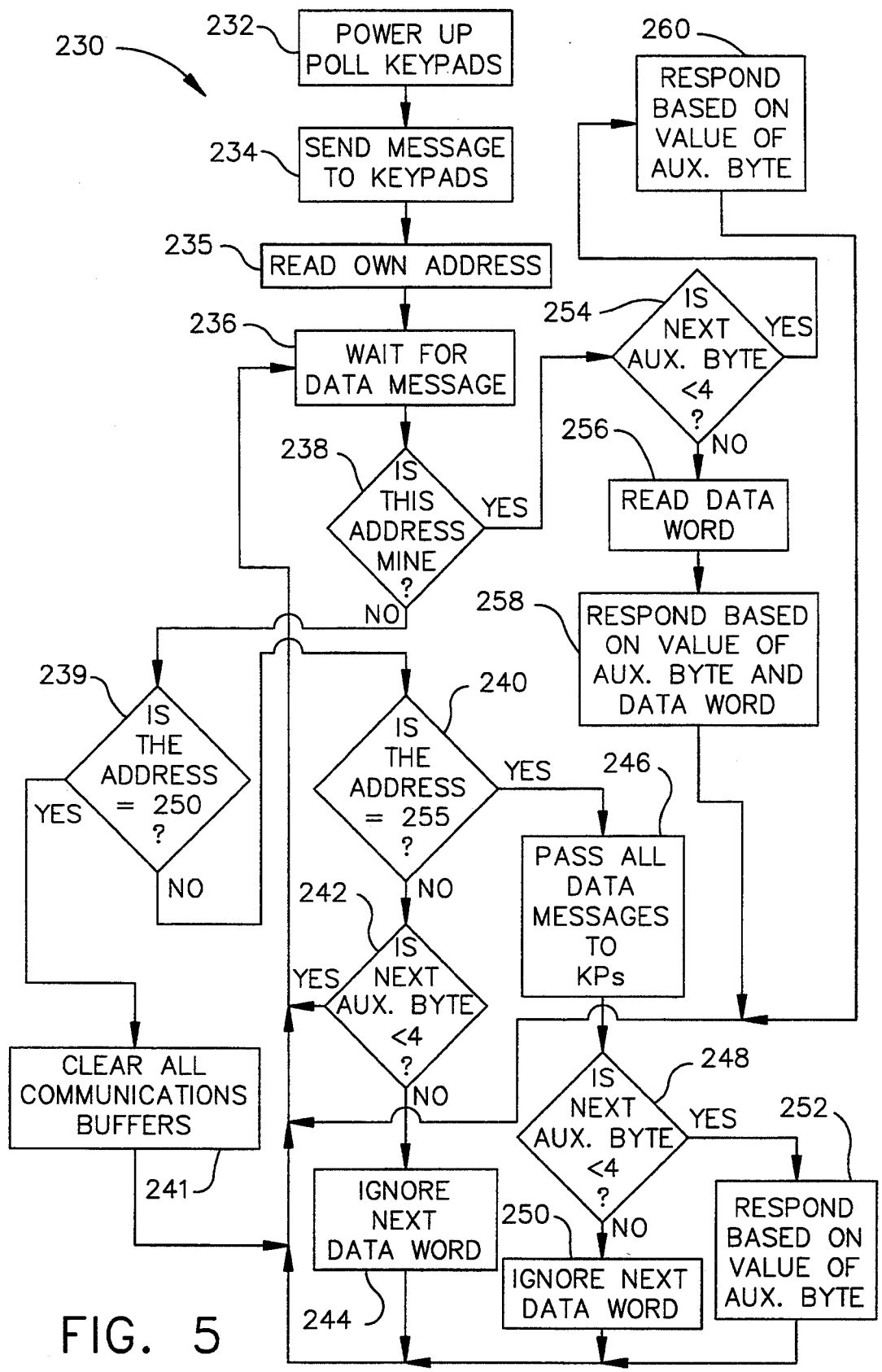
FIG. 5 is a flow chart of the operational functions of the intelligent junction box as used in FIG. 1.

FIG. 5 provides a junction box flow diagram generally designated by the numeral 230. The first thing each intelligent junction box 30 does upon power-up is to poll all of the keypads 50 that are connected to it, according to function block 232. The junction box 30 sends a message over the keypad network data cable 52, by using the following message format: KEYPAD ADDRESS, auxiliary byte, data word. Each junction box 30 starts with the keypad address of one (1) and polls all the way through keypad address two hundred (200), unless the keypads 50 have already been initialized and they already know their own keypad addresses.

If the keypads 50 already know their addresses, then each junction box 30 will start polling with keypad address #1, then increment through all two hundred (200) keypads 50, if necessary. However, once a particular junction box 30 has communicated with its total compliment of twenty (20) keypads 50 already containing addresses, it will then discontinue attempting to poll additional keypads 50. In other words, if junction box #1 (having the address #201) is connected to keypads 50 having the addresses 1–20, then that junction box #1 would poll through keypads 1–20 and then discontinue any further attempts to poll other keypads 50. The same would be true for a junction box #2 (having address #202), connected to keypads 50 having the addresses 21–40. In that instance, junction box #2 would poll through keypad addresses 1–40, and then discontinue its attempt to continue polling further keypads 50. The message format from a junction box 30 attempting to poll, for example, keypad #1 is as follows: 1, 1, 0. The first number, one (1) is the keypad address, the second number, also a one (1), is the auxiliary byte value, which commands the keypad 50 to send its data back to the junction box 30, and the data word of zero (0) is ignored for this message.

After the polling process has been completed, the junction box 30 sends a message to each of its keypads 50 that are connected to it, using function block 234. The format of the message is as follows: KEYPAD ADDRESS, 17, 0. At each of the keypads 50 whose address is given in one of these messages, a message appears on their displays 68, as follows: "—PRECISION SCAN—, * Please wait *." Once this is accomplished, the junction boxes 30 and the keypads 50 wait until they start to receive messages from CPU 20, according to function block 236. After the junction box 30 has polled the keypads 50 associated in its keypad network, it reserves memory space in an array for each of those keypads 50. This array information includes the address of each of the keypads 50, which is stored in each of the appropriate junction boxes 30. That keypad address information is not, however, passed on to CPU 20. As related above, when CPU 20 wishes to communicate with a particular keypad 50 having the address between #1 and #200, that communication will be first sent to all junction boxes 30, and then the appropriate junction box 30 which recognizes that particular keypad's address will then further communicate that same message to its keypad network. In this way, the correct keypad 50 will ultimately receive its message from CPU 20.

Each junction box 30 reads the DIP-switch 48 to learn its own junction box address, according to function block 235. After reading DIP-switch 48, each junction box 30 will have an address in the range of 201–210, and will report that address in every communication to CPU 20.

Since each intelligent junction box 30 is connected to both the junction box network (via data cable 32) and the keypad network (via data cable 52), each junction box 30 receives and transmits messages from both CPU 20 and from its associated keypads 50. As related above, the addresses of the keypads 50 are preferably in the range of 1–200, inclusive, and the addresses for the junction boxes 30 are in the range from #201 through #210, inclusive. Using a data byte of 8 bits, other addresses in the range from 211–255, and zero (0) are also available to be used in the preferred data collection system 10. Virtually every message that is sent by CPU 20 having the address of between 1–200, inclusive, is passed directly through from the junction box network to that particular junction boxes' associated keypad network. In this manner, messages sent from CPU 20 quickly arrive at the keypads 50 which are meant to receive those messages. If the address of #254 is selected by CPU 20, then the junction boxes 30 will also pass that message through, which will be received and acted upon by each of the keypads 50 in data collection system 10. In addition, if the address #255 is selected by CPU 20, then all junction boxes 30 and all keypads 50 will receive and act upon such messages.

Once the initial polling has taken place, each junction box 30 contains the information necessary so that it knows the addresses of each of the up to twenty (20) keypads 50 that are connected to that particular junction box 30. The next time a particular junction box 30 is commanded to poll its keypads 50, that junction box 30 will sequentially scan each of its keypads 50, one at a time. The junction box 30 will not scan all of the possible keypad addresses (1–200) in this instance, but will start with the lowest addressed keypad 50 in its own keypad network, and then directly jump to its next keypad address, continuing on until it has polled all of the keypads 50 within its own keypad network. In this manner, each junction box 30 will swiftly poll through all of its associated keypads 50, and will continue to sequentially poll all of those keypads until it receives its "stop" polling command from CPU 20.

The auxiliary byte, which is normally the second data byte in a particular serial message, is very important to the operation of any of the components of data collection system 10. For example, if CPU 20 sends a message to a junction box 30 having the auxiliary byte value of nineteen (19), then that junction box 30 will begin polling its keypads 50. The message format for such a communication would be as follows: JUNCTION BOX ADDRESS, 19, 0. That particular junction box 30 will start to poll its individual keypads 50 (up to twenty (20) of them) by sending the following data message: KEYPAD ADDRESS, 19, Question Number. In this case, the junction box 30 is commanding each of its keypads 50 to accept key entry at their pushbutton switches, S0–S11. A message will appear on the keypads' display 68, as follows: "QUESTION (____), Answer now." (The keypad display 68 would show, e.g., "QUESTION #23, Answer now.")

After this occurs, when CPU 20 wishes to stop polling, it sends a message having an auxiliary byte value of twenty (20) to each of its junction boxes 30 that have been polled. Each of these junction boxes 30, will, in turn, send a message to their individual keypads 50, which also contains an auxiliary byte value of twenty (20), commanding each keypad 50 to stop accepting key entry from its switches S0–S11. In addition, the keypad 50 will display a message on its liquid crystal display 68 as follows: "Thank you, Please wait".

Once the junction box 30 starts to receive a message from CPU 20, that message is checked to reveal which address the message is meant for. Decision block 238 checks to see if the message is intended for this particular junction box 30. If so, decision block 254 checks to see if the auxiliary byte has a value less than four (4). If the answer is "yes" to that question, function block 260 responds based upon the value of the auxiliary byte. For example, if the value of the auxiliary byte is equal to one (1), then that particular junction box 30 is being commanded to send its data contents to CPU 20. Such a command would normally be given by CPU 20 during a polling routine of the keypads 50. The junction box 30 would respond with a series of data messages, using the following format:

---
JUNCTION BOX ADDRESS, auxiliary byte = 4, 0;
KEYPAD ADDRESS, auxiliary byte, data word;
KEYPAD ADDRESS, auxiliary byte, data word;
KEYPAD ADDRESS, auxiliary byte, data word;
.
.
KEYPAD ADDRESS, auxiliary byte, data word;
JUNCTION BOX ADDRESS, 0, 0.
---

The above data message begins with the junction box 30 sending its own address back to CPU 20, thereby identifying itself, and also including the auxiliary byte value of four (4), which means that data will follow. The zero (0) that follows represents a data word which is ignored at this time. The next portion of the message gives a keypad address, so the CPU 20 knows exactly which keypad 50 corresponds to the following data. After the keypad address is given, an auxiliary byte value of either four (4) or 132 is sent to CPU 20. The data word that follows is either sixteen (16) bits in length or seventeen (17) bits in length, depending upon the value of the auxiliary byte. If the auxiliary bytes' value is equal to four (4), then a sixteen (16) bit data word is sent to CPU 20. On the other hand, if the auxiliary bytes' value is equal to 132, then a seventeen (17) bit data word is sent to CPU 20, thereby providing a binary value up to 99,999 in decimal. It will be understood that a seventeen (17) bit data word can have a binary value up to 131,072, however, it is preferred that the numeric value be artificially limited to 99,999 for this particular application. After the last keypads' data has been sent, the junction box 30 sends out its address again, followed by a zero (0), followed by another zero (0). This signifies the end of the data that is being transmitted to CPU 20 at this time.

If decision block 254 determines that the next auxiliary byte is not less than four (4), then the data word is read by function block 256. After that occurs, the intelligent junction box 30 responds, according to function block 258, depending upon the value of the auxiliary byte and the data word. Examples of such responses are as follows: if the value of the auxiliary byte is five (5), then the junction box 30 is placed into a mode where it is looking for a keypad 50 to be initialized. If one of the keypads 50 attached to the keypad network of this particular junction box has its enter key (S-11) pressed by the set-up operator, then the junction box 30 will receive a message from that keypad 50 informing it that this keypad 50 is now active. The junction box 30 further transmits that message on to CPU 20.

If the CPU 20 wishes to uninitialize at least one of the keypads 50, it sends an auxiliary byte having a value of seven (7). After this message is received by a particular junction box 30, the junction box clears its address registers for the particular keypad 50 which is being uninitialized, or clears all address registers if all keypads 50 are being uninitialized.

After junction box 30 has finished responding to a message received from CPU 20, according to either function block 258 or 260, then the control logic waits at function block 236 to receive a new data message. If the junction box 30 receives a message having the address of #250, which will be detected by decision block 239, then all of the communications buffers will be cleared within the junction box 30. Function block 241 clears all communications buffers so that if any garbled message had been detected by CPU 20, it now can start anew with a communications message, and all of the junction boxes 30 and keypads 50 will be ready to receive a new message. After all of the communications buffers have been cleared by function block 241, the control logic waits at function block 236 for a new data message.

If the address in the message from CPU 20 is equal to #255, that will be detected by decision block 240. If the address is not equal to #255, then decision block 242 detects whether or not the following auxiliary byte is less than four (4). If the auxiliary byte's value is less than four (4), then there will be no following data word, and the control logic now waits at function block 236 for the next data message. On the other hand, if the next auxiliary byte is not less than four (4), then a data word will follow, which must be ignored and disposed of by function block 244. At this time, the particular junction box 30 is receiving a communications message which is intended for a different address, however, this particular junction box 30 still receives the auxiliary byte and the data word, and must properly dispose of these portions of the message so that it is ready for the next new data message arriving to function block 236.

If the message address was equal to #255, the message is to be acted on by this particular junction box 30, and is to be passed to its associated keypads 50, according to function block 246. After the address #255 is received, the junction box 30 must determine if the next auxiliary byte is less than four (4) or not, such determination being made by decision block 248. If the auxiliary byte is not less than four (4), the next data word is ignored by function block 250. Such an occurrence would be, for example, when CPU 20 is sending a multi-key "on" message (auxiliary byte=64), or a multi-key "off" message (auxiliary byte=65). If the auxiliary byte is less than four (4), then junction box 30 will respond based upon the value of the auxiliary byte, according to function block 252.

Figure 6:
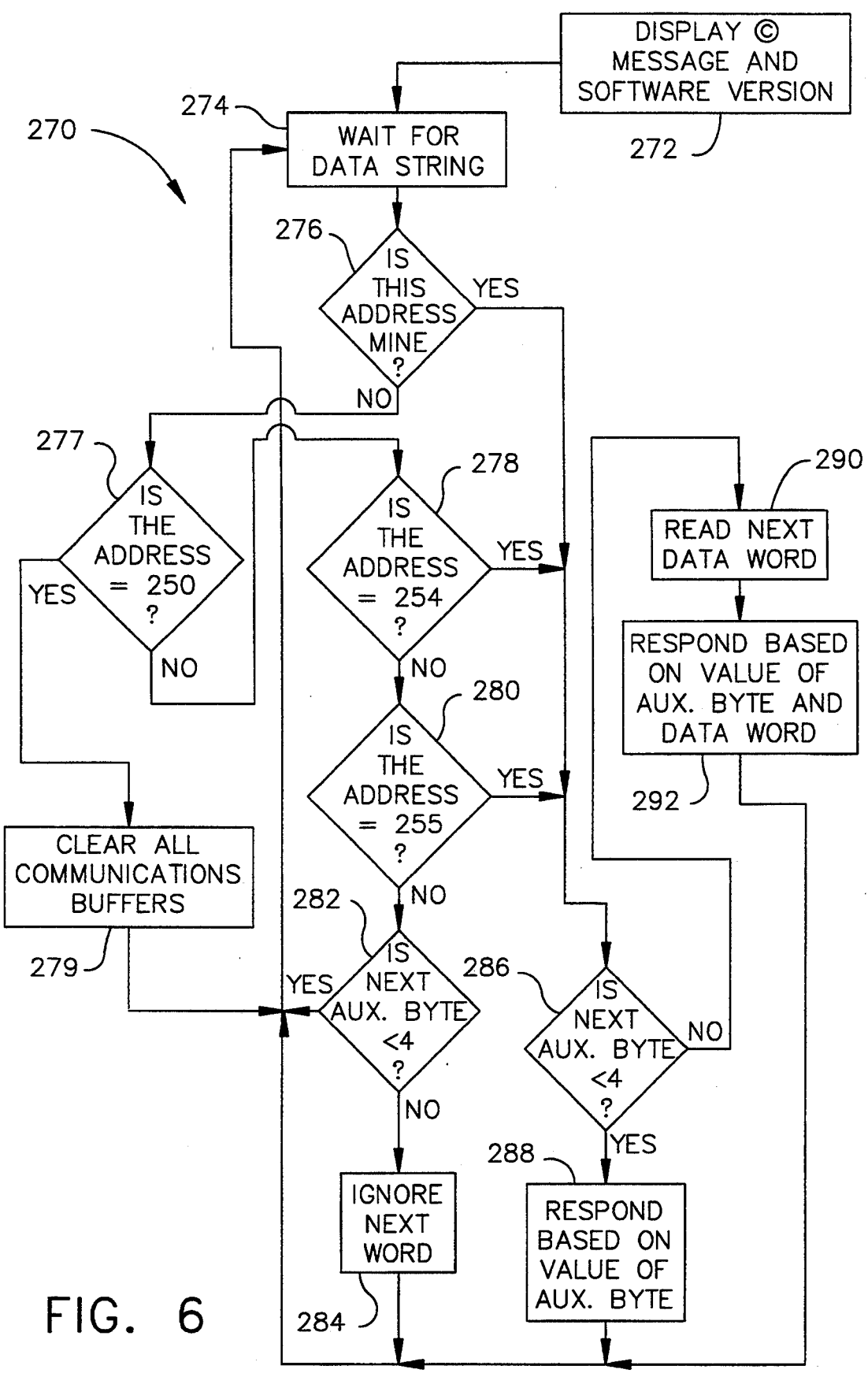
FIG. 6 is a flow chart of the operational functions of the smart keypad as used in FIG. 1.

The keypad flow diagram 270 is depicted on FIG. 6. When the keypad 50 is first turned on, the liquid crystal display 68 will display a copyright message and the software version number, according to function block 272. After that has occurred, keypad 50 waits for a data string to be received from its associated junction box 30, according to function block 274. Decision block 276 determines whether the data string contains the address of this particular keypad. If this keypad's address has been received, then decision block 286 checks to see if the value of the next auxiliary byte is less than four (4). If the auxiliary byte's value is less than four (4), then function block 288 responds based on the value of the auxiliary byte. If CPU 20 wants the value of the data entered by a respondent into this particular keypad 50, then the value of the auxiliary byte will be equal to one (1). The keypad 50 will then respond with a message back to the associated junction box 30 having the following format: KEYPAD ADDRESS, auxiliary byte=4, data word. This above message is based upon the assumption that the respondent at this keypad 50 has already entered data via the pushbutton switches S0–S11. If that respondent has not yet entered any data, then the above message format will instead be as follows: KEYPAD ADDRESS, auxiliary byte=2 (then no data word at all).

As the CPU 20 polls the various junction boxes 30 one at a time, each of the keypads 50 will be asked to send their data contents to their associated junction box 30. If a particular keypad 50 has already sent its data value to its associated junction box 30, then, when it receives a request to send data (if the auxiliary byte is equal to one (1) in the message received at this keypad), the message format that this keypad 50 will transmit in this circumstance will be as follows: KEYPAD ADDRESS, auxiliary byte=3 (no data word at all). The auxiliary byte value of three (3) tells the junction box 30 that this particular keypad 50 has already responded and sent its latest data word down to that junction box 30.

If decision block 286 determines that the next auxiliary byte is not less than four (4), then function block 290 will read the next data word in the message received from its associated junction box 30. Function block 292 will then respond based upon the value of the auxiliary byte and the data word received. Examples of such auxiliary bytes and data words are as follows: if the auxiliary byte has a value in the range of 16–34, inclusive, then the keypad 50 is being commanded to display an appropriate message on its liquid crystal display 68. If the auxiliary byte's value is nineteen (19), the keypad 50 is being commanded to accept key entry. If the auxiliary byte's value is equal to twenty (20), then the keypad 50 is being commanded to stop accepting key entry. If the auxiliary byte's value is equal to five (5), then the keypad 50 is being initialized. If the auxiliary byte's value is equal to seven (7), then this particular keypad 50 is being uninitialized.

If the keypad 50 is being told to uninitialize, it will forget whatever memory address that it previously contained and will also clear out any keypad data from its memory circuits. If this keypad 50 is being commanded to initialize itself, then it will retain the keypad address that is presently being sent down by CPU 20 if the set-up operator presses the Enter switch (S11) of this keypad 50. As part of that process, this particular keypad 50 will send back a message to its junction box 30 and CPU 20, having the following format: KEYPAD ADDRESS, auxiliary byte=6, data word=0, thereby informing CPU 20 that this keypad 50 is active and will respond to that keypad address.

If a particular keypad 50 is commanded to accept key entry (auxiliary byte=19), then it activates its switches S0–S11 and will store the value of the switch or switches pressed by its human respondent. Once that occurs, the switches are locked out and that value cannot be changed by the human respondent. If the CPU 20 sends a message to stop accepting key entry (auxiliary byte=20), then the keypad 50 will not accept any entry from its human respondent even if that respondent had not entered any number before that moment.

A variation on this theme is if a particular keypad 50 has been placed in the multi-key mode "on" condition. If that has occurred, then the human respondent can press up to five numbers in the range 0–9 (using S0–S9), and then press the Enter key (S11). This will input a five digit decimal number into the memory of the keypad 50, which will then later be sent back to CPU 20 via junction box 30. The key with the value of ten (10) (switch S10) is not activated for the multi-key mode "on" operation of a keypad 50. If the multi-key mode condition is "on", then extended data is sent back to the junction box 30, wherein the data word is seventeen (17) bits long rather than only sixteen (16) bits. In that circumstance, when a keypad 50 responds to a message to send data (where the auxiliary byte is equal to one (1)), the message format sent by this keypad 50 is as follows: KEYPAD ADDRESS, auxiliary byte=128, 17-bit data word.

Each keypad 50 contains several pre-stored messages that are activated according to the value of auxiliary bytes in the range of 16–34, inclusive, in the preferred data collection system 10. The various messages are used for the human respondents to properly answer the questions, and also for the set-up operator of the data collection system 10 to choose which keypads 50 will have which addresses. Other operational information is also included in some of the messages, including when a keypad 50 is initialized or when a keypad 50 is ready to be tested. Once the data collection system 10 has programmed all of its keypads 50 with addresses, a keypad test mode occurs which can test between one and twelve keys of each smart keypad 50. As related above, a "Ready to test" message is sent to each keypad 50 from 1–200, one at a time, by use of the following message: KEYPAD ADDRESS, auxiliary byte=33, NUMBER OF KEYS TO TEST. After a keypad 50 receives that message, its display 68 says, "Ready to test." If only one key is to be tested at a keypad 50, then the set-up operator can walk up to that keypad and press any one of its switches numbered 0–10 (switches S0–S10), and then liquid crystal display 68 at that particular keypad 50 will display that entered number. If for any reason the incorrect number appears upon the display 68, or if no number appears on the display at all, then that keypad 50 has failed the test. Once the keypad 50 has responded to the "Ready to test" message, it sends back a message to CPU 20 letting it know that it has completed its test. CPU 20 then transmits a message to this particular keypad 50, having the data format as follows: KEYPAD ADDRESS, auxiliary byte=34, KEYPAD ADDRESS. After this particular keypad 50 receives that message, its liquid crystal display 68 will display the message, "Tested".

Certain messages are sent by CPU 20 which are to be received and acted upon by all keypads 50 in the data collection system 10. If CPU 20 detects a garbled message in the communications system, then it will send out a message having an address of #250, an auxiliary byte value of #250, and a data word value of 250. When the keypad 50 detects this, by use of decision block 277, it then clears all of its communications buffers using function block 279. After that occurs, keypad 50 waits according to function block 274 for the next data string.

If CPU 20 wishes to send a message to all of the keypads 50, but to none of the junction boxes 30, it uses the address #254. This is detected by decision block 278 of each of the keypads 50. Once that occurs the keypad 50 checks to see if the value of the auxiliary byte is less than four (4) using decision block 286. Keypad 50 responds based upon the value of the auxiliary byte according to function block 288 if the auxiliary byte is less than four (4), or responds based upon the value of the auxiliary byte and data word according to function block 292 if the auxiliary byte's value is not less than four (4). Examples of situations where this can occur are when CPU 20 wishes to produce certain messages upon the displays 68 of each of the keypads 50. For example, if the auxiliary byte's value is equal to sixteen (16), and the address is equal to 254, then each of the system keypads 50 will display the message, "Welcome! Thanks for coming".

If CPU 20 wishes to send a message to be received and acted upon by all keypads 50 and junction boxes 30 in the system, then it uses the address #255, which is detected by decision block 280. As before, the next step is to determine whether or not the next auxiliary byte value is less than four (4), again made by decision block 286. After this determination is made, the control logic for the keypad 50 responds as described above, either based upon the value of the auxiliary byte (using function block 288) or based upon the value of the auxiliary byte and the data word (using function block 292). Examples of this circumstance are where the CPU 20 wishes to place all of the keypads 50 into the multi-key mode, using the auxiliary byte value of sixty-four (64). CPU 20 may, alternatively, wish to place the multi-key mode into the "off" state, by using the auxiliary byte value of sixty-five (65). Initialization and uninitialization messages (having auxiliary byte values of either five (5) or seven (7)) can also be received by each keypad 50, and each intelligent junction box 30, simultaneously. Such messages can also be selectively received by only one keypad 50 in which its associated junction box 30 will accordingly respond by addressing the appropriate message to only that keypad 50.

If the message address is not for this particular keypad 50, and is not #250, #254, or #255 in value, then decision block 282 determines whether or not the auxiliary byte's value is less than four (4). If the auxiliary byte's value is less than four (4), then this keypad 50 waits according to function block 274 for the next data string. If the auxiliary byte's value is not less than four (4), then this keypad 50 ignores the next data word using function block 284, and waits for the next data string according to function block 274. The normal situation upon this occurrence is where this keypad 50 is receiving a message which is meant for another keypad 50 having a different address.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A data collection system, comprising:
   (a) a central computing apparatus, said central computing apparatus including a first processing circuit, and including a first communications circuit for communicating data to and from said central computing apparatus;
   (b) at least one intelligent junction box, each of said at least one intelligent junction box including:
      (i) first physical communications wiring between said at least one intelligent junction box and said central computing apparatus, and a second communications circuit which communicates with the first communications circuit of said central computing apparatus over said first physical communications wiring;
      (ii) a second processing circuit that selects an identifying address which is distinct as compared to the identifying address of another intelligent junction box within said data collection system;
   (c) a plurality of smart keypads, each of said plurality of smart keypads including:
      (i) second physical communications wiring between each of said smart keypads and said at least one intelligent junction box, and a third communications circuit which communicates with the second communications circuit of one of said at least one intelligent junction box over said second physical communications wiring;
      (ii) an alpha-numeric display;
      (iii) a plurality of switches having numeric values and an additional switch used to enter data;
      (iv) a third processing circuit that selects an identifying address which is distinct as compared to the identifying address of any other smart keypad within said data collection system;

(d) said first, second, and third processing circuits configured to control, while setting up the data collection system, said plurality of smart keypads and at least one intelligent junction box by individually programming the identifying address of each smart keypad in a sequence determined by a systems operator, said programming being accomplished by interaction between said central computing apparatus and each smart keypad, and any of the plurality of smart keypads in the data collection system being programmable to contain any one of said identifying addresses available to smart keypads, without regard to the physical location of any individual smart keypad or to the particular second physical communications wiring attached to any individual smart keypad;

(e) said first, second, and third processing circuits configured to control, while conducting a data collection session, said plurality of smart keypads and at least one intelligent junction box, comprising:

(i) said alpha-numeric display configured to display, in real time, the same question to human respondents located at said plurality of smart keypads and for entering an appropriate answer into said plurality of smart keypads in real time, by use of said plurality of switches;

(ii) said third communications circuit configured to transmit, in real time, information corresponding to said appropriate answer entered at each of said plurality of smart keypads to their associated intelligent junction boxes; and (iii) said second communications circuit configured to transmit, in real time, said information to said central computing apparatus.

2. The data collection system as recited in claim 1, further comprising:

(a) a data storage device and a video display at said central computing apparatus;

(b) said first, second, and third processing circuits configured to control, while conducting a data collection session, said plurality of smart keypads and at least one intelligent junction box, in real time, and to store, in real time, said information within said data storage device, and said video display configured to display, in real time, the status of the information.

3. The data collection system as recited in claim 1, wherein the plurality of switches and the additional switch used to enter information at each of said plurality of smart keypads comprises means for the human respondents to provide a numeric answer having a value in the range from zero to 99,999, inclusive.

4. A data collection system, comprising:

(a) a central computing apparatus, including:

(i) a local keyboard;

(ii) a local video display;

(iii) a first processing circuit which controls the transfer of data within said central computing apparatus;

(iv) a first communications circuit that receives data from said local keyboard, said first processing circuit configured to perform one or more tasks depending on the contents of that data;

(v) a first memory device which stores and retrieves data;

(vi) a second communications circuit that transmits data to said local video display;

(vii) a third communications circuit for communicating data to and from said central computing apparatus;

(b) at least one intelligent junction box, each of said at least one intelligent junction box comprising:

(i) first physical communications wiring between said intelligent junction box and said central computing apparatus, and a fourth communications circuit that communicates with the third communications circuit of said central computing apparatus over said first physical communications wiring;

(ii) a second processing circuit which controls the transfer of data within said intelligent junction box, and which selects an identifying address which is distinct as compared to the identifying address of any other intelligent junction box within said data collection system;

(iii) a second memory device which stores and retrieves data;

(c) a plurality of smart keypads, each of said plurality of smart keypads comprising:

(i) second physical communications wiring between each of said smart keypads and said at least one intelligent junction box, and a fifth communications circuit that communicates with the fourth communications circuit of one of said at least one intelligent junction box over said second physical communications wiring;

(ii) an alpha-numeric display for displaying data received from said at least one intelligent junction box and from said central computing apparatus;

(iii) a third processing circuit which controls the transfer of data within said smart keypad, and selects an identifying address which is distinct as compared to the identifying address of any other smart keypad within said data collection system;

(iv) a third memory device which stores and retrieves data;

(v) a plurality of switches having numeric values and an additional switch used to enter information;

(d) said first, second, and third processing circuits configured to control, said plurality of smart keypads and said at least one intelligent junction box, comprising:

(i) said first, second, and third processing circuits further configured to individually program, while setting up the data collection system, the identifying address of each of said plurality of smart keypads in a sequence determined by a systems operator via interaction between said central computing apparatus and each smart keypad, and any of the smart keypads in the data collection system being programmable to contain any one of said identifying addresses available to smart keypads, without regard to the physical location of any individual smart keypad or the particular second physical communications wiring attached to said any individual smart keypad;

(ii) said second processing circuit further configured to store, in said second memory device of each of said at least one intelligent junction box the identifying address of each smart keypad that is in communication with that particular intelligent junction box, and configured to reserve space within said second memory device of each intelligent junction box for information transmitted by each smart keypad to that particular intelligent junction box;

(iii) said alpha-numeric display configured to display, in real time, the same question to human respondents located at said plurality of smart keypads and for entering an appropriate answer into one of said plurality of smart keypads, in real time, by use of said plurality of switches, and said third processing circuit further configured to store said answers in the third memory device of each of said plurality of smart keypads that are actuated by a human respondent;

(iv) said third communications circuit configured to transmit, in real time, information corresponding to the stored answer in said third memory device of each of said plurality of smart keypads via said second communications wiring to each of said intelligent junction boxes, and said second processing circuit configured to store said information in said second memory device, within said space that had been reserved for that information, of each intelligent junction box; and (v) said second communications circuit configured to transmit, in real time, said information to said central computing apparatus, said first processing circuit further configured to store said information in said first memory device, and said local video display configured to display, in real time, the status of the information.

5. The data collection system as recited in claim 4, wherein the alpha-numeric display at each of said plurality of smart keypads comprises means for presenting messages useful to the systems operator during the setting up of the data collection system.

6. The data collection system as recited in claim 4, wherein the alpha-numeric numeric display at each of said plurality of smart keypads is configured to present messages useful to the human respondents.

7. The data collection system as recited in claim 4, wherein the plurality of switches of each of said plurality of smart keypads comprise means for the human respondents to provide a numeric answer having a value in the range from zero to ten, inclusive.

8. The data collection system as recited in claim 4, wherein the plurality of switches and the additional switch used to enter information of each of said plurality of smart keypads comprise means for the human respondents to provide a numeric answer having a value in the range from zero to 99,999, inclusive.

9. The data collection system as recited in claim 4, further comprising:
(a) a remote video display;
(b) a sixth communications circuit for communicating information to said remote video display; and
(c) said first processing circuit further configured to statistically analyze, in real time, information corresponding to the stored answers in said second memory device of each of said at least one intelligent junction box, and said remote video display configured to display that information, in real time.

10. The data collection system as recited in claim 4, wherein ten of said at least one intelligent junction boxes are connected to said central computing apparatus, and twenty of said plurality of keypads are connected to each of said at least one intelligent junction boxes.

11. A method for collecting data from human respondents, comprising the steps of:
(a) providing a data collection system including:
  (i) a central computing apparatus, said central computing apparatus comprising:
    (A) a data storage device;
    (B) a video display;
    (C) a first communications circuit for communicating data to and from said central computing apparatus;
  (ii) at least one intelligent junction box, each of said at least one intelligent junction box including:
    (A) first physical communications wiring between said at least one intelligent junction box and said central computing apparatus, and a second communications circuit which communicates with the first communications circuit of said central computing apparatus over said first physical communications wiring;
    (B) a first processing circuit that selects an identifying address which is distinct as compared to the identifying address of any other intelligent junction box within said data collection system;
  (iii) a plurality of smart keypads, each of said plurality of smart keypads including:
    (A) second physical communications wiring between each of said smart keypads and said at least one intelligent junction box, and a third communications circuit which communicates with the second communications circuit of one of said at least one intelligent junction box over said second physical communications wiring;
    (B) an alpha-numeric display;
    (C) a plurality of switches having numeric values and an additional switch used to enter data;
    (D) a second processing circuit that selects an identifying address which is distinct as compared to the identifying address of any other smart keypad within said data collection system;
(b) setting up a data collection system by individually programming the identifying address of each smart keypad in a sequence determined by a systems operator, said programming being accomplished by interaction between said central computing apparatus and each smart keypad, and any of the smart keypads in the data collection system being programmable to contain any one of said identifying addresses available to smart keypads, without regard to the physical location of any individual smart keypad or to the particular second physical communications wiring attached to any individual smart keypad;
(c) conducting a data collection session by:
  (i) displaying, in real time, the same question to human respondents located at said plurality of smart keypads and accepting an appropriate answer from the human respondent at one of said plurality of smart keypads, by use of said plurality of switches;
  (ii) transmitting, in real time, information corresponding to said answer entered at each of said plurality of smart keypads to their associated intelligent junction boxes; and
  (iii) further transmitting, in real time, information corresponding to said answer entered at each of said plurality of smart keypads to said central computing apparatus, storing, in real time, said information within said data storage device, and displaying, in real time, the status of the information on said video display.

12. A method for collecting data from human respondents as recited in claim 11, including the step of accepting numeric answers having values in the range from zero to 99,999, inclusive, by actuation of the plurality of switches and the additional switch used to enter data of each of said plurality of smart keypads.

* * * * *

UNITED STATES PATENT AND TRADEMARK OFFICE
CERTIFICATE OF CORRECTION

PATENT NO. : 5,361,200
DATED : November 1, 1994
INVENTOR(S) : Kenneth N. Weybright, Thomas M. Forde & Lawrence H. Mitchell It is certified that error appears in the above—identified patent and that said Letters Patent is hereby corrected as shown below:

In column 20, line 50, (claim 1), "another" should read --any other--

Signed and Sealed this

Seventh Day of March, 1995

Attest:

BRUCE LEHMAN

Attesting Officer

Commissioner of Patents and Trademarks